UNITED STATES PATENT OFFICE.

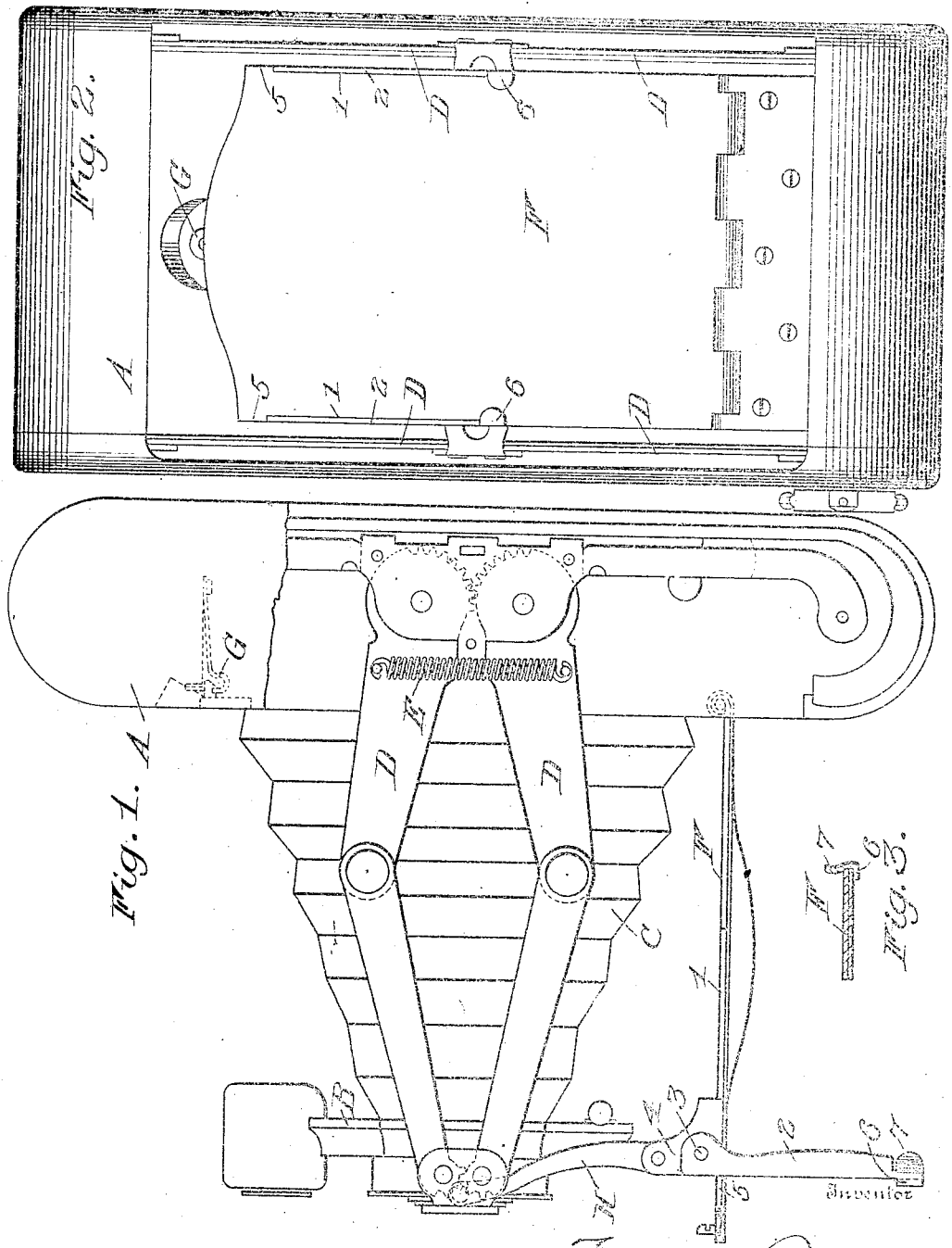

FRANK A. BROWNELL, OF ROCHESTER, NEW YORK, ASSIGNOR TO EASTMAN KODAK CO., OF ROCHESTER, NEW YORK, A CORPORATION OF NEW YORK.

FOLDING PHOTOGRAPHIC CAMERA.

No. 905,122.     Specification of Letters Patent.     Patented Nov. 24, 1908.

Original application filed May 18, 1905, Serial No. 261,082. Divided and this application filed May 18, 1907. Serial No. 374,501.

*To all whom it may concern:*

Be it known that I, FRANK A. BROWNELL, of Rochester, in the county of Monroe and State of New York, have invented certain new and useful Improvements in Folding Photographic Cameras; and I do hereby declare the following to be a full, clear, and exact description of the same, reference being had to the accompanying drawings, forming a part of the specification, and to the reference-numerals marked thereon.

My present invention relates to folding cameras and particularly to that class in which the lens board is connected to the camera body by a bellows which, with the lens, is adapted to be housed by the said camera body. In this class of cameras the lens board and the bellows, in closed position, are covered by a door which supports said parts in their operative position and is provided with one or more legs. These legs together with the camera body, enable an operator to support the camera in an upright position upon a table or other object for the purpose of holding the camera stationary when it is desirable to make a time exposure.

It is an object of my invention to provide legs of this type that are inexpensive to manufacture and so constructed and mounted that, in operative position, they form strong and effective supports and in inoperative position they are housed and will not interfere with the handling of the camera, as for instance, with the insertion of the latter into a pocket of wearing apparel.

Other and further objects will appear in the following description and will be more particularly pointed out in the claims hereto appended.

In the drawings: Figure 1, is a side view of a camera in its operative position, showing my improvement applied thereto; Fig. 2, is a front view of the camera in closed position, showing the legs in folded position; and, Fig. 3, is a detail sectional view showing the manner in which a supporting leg engages the side of the cover.

The invention is shown as applied to a camera described and claimed in my prior patent No. 886,473, granted May 5th, 1908 on an application, of which this application is a division. In this camera, A indicates the camera body, B the lens board, C the bellows connecting the lens board and the camera body and D the system of levers for supporting the lens board, during its movement to and from operative position; the camera being opened automatically by the spring E upon the release of a hinged door F by a suitable latch G, and being closed through the medium of links H pivotally connected to the lens board and to the door F. No claim is made in this application for this construction.

The door is formed on its opposite side edges with elongated recesses 1, and pivoted legs 2 which, when in a closed position, lie within these recesses. These legs 2 are preferably made from sheet metal and have their pivots 3 arranged on the inner face of the door, as for instance, by being connected with the plates or ears 4 to which the links H are pivoted. With this arrangement of the pivots it is possible to employ the end walls 5 of the recesses as shoulders for supporting the legs in operative position and for limiting the swinging movement of the latter in the opening direction. Near their free ends the legs are formed with extensions 6 which act as stops for limiting the movement of the legs in the other or closing direction and provide finger pieces for withdrawing the legs from the recesses. To lock the legs in their closed or inoperative position, the legs carry latches 7 in the form of spring fingers bent laterally from one side of the plate forming the leg and adapted to engage the side edges of the door.

I claim as my invention:

1. In a folding camera, the combination with a camera body and a lens board adapted to be housed by said body, of a hinged door adapted to cover said lens board when the latter is in inoperative position, and a leg pivoted in a position to support the camera when the latter is in open position and having a spring finger adapted to engage the edge of the door.

2. In a folding camera, the combination with a camera body and a lens board adapted to be housed by said body, of a hinged door having a recess on one side and adapted to cover said lens board when the latter is in inoperative position, and a leg pivoted to the door in a position to support the camera when the latter is in open position, said leg being adapted to lie within the recess and having means projecting from the outer face of the door by which it may be withdrawn from said recess.

3. In a folding camera, the combination with a camera body and a lens board adapted to be housed by said body, of a hinged door having a recess on one side and adapted to cover said lens board when the latter is in inoperative position, and a leg pivoted to the door in a position to support the camera when the latter is in open position, and adapted to lie within the recess and having a spring finger adapted to engage the edge of the door, means being arranged thereon adjacent to said finger to engage the edge of the door when the leg is within said recess.

4. In a folding camera, the combination with a camera body and a lens board adapted to be housed by said body, of a hinged door having a recess on one side and adapted to cover said lens board when the latter is in inoperative position, an ear on the inner face of the door, and a leg pivoted to said ear, at a point above the inner face of the door and adapted to lie within the recess when in closed position and to engage one end wall of the recess when in open position.

FRANK A. BROWNELL

Witnesses:
WALTER B. PAYNE,
H. H. SIMMS.